Nov. 13, 1962   G. B. BRUECKER   3,063,497
SILO DOOR
Filed April 6, 1959
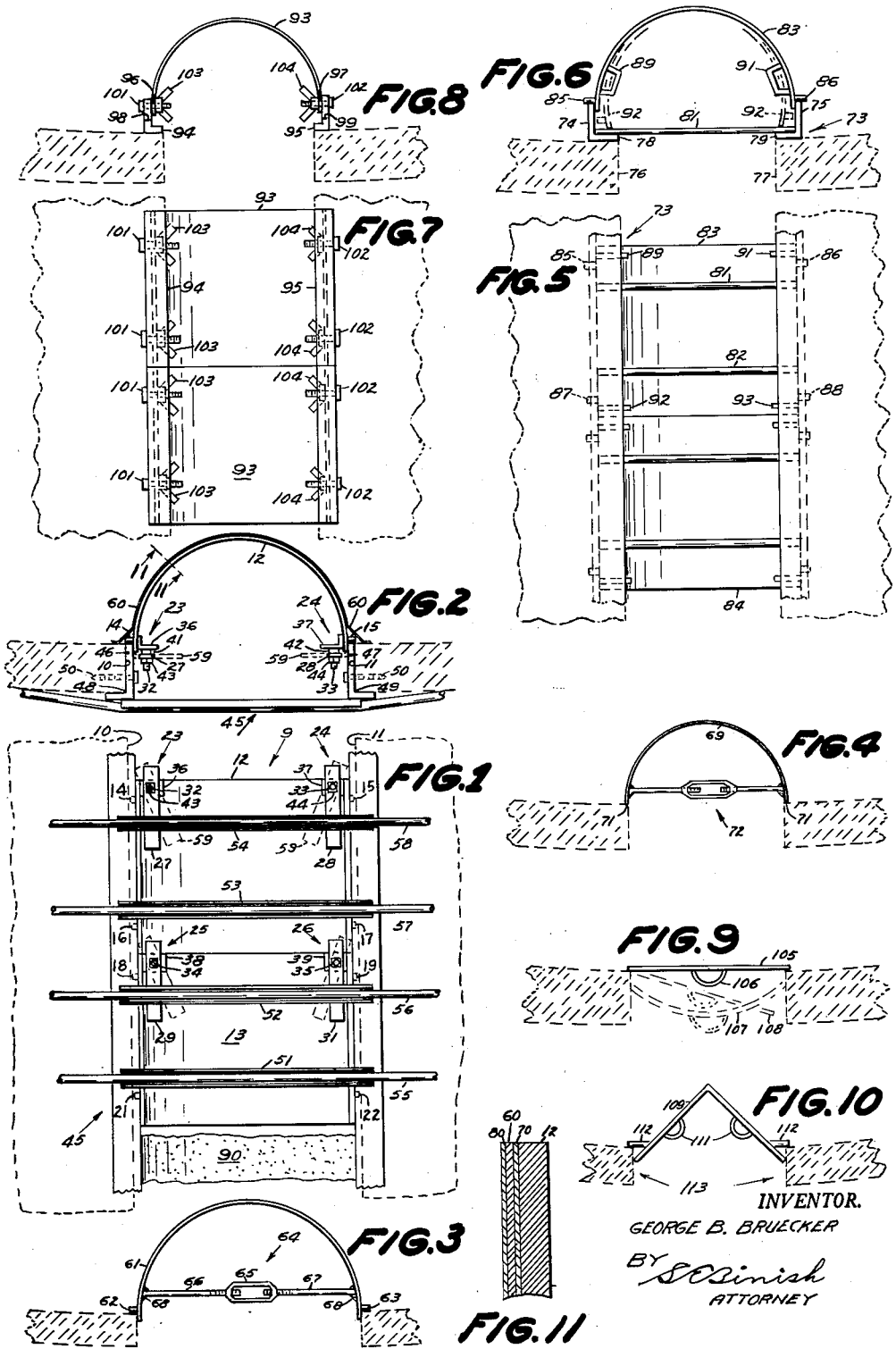
INVENTOR.
GEORGE B. BRUECKER
BY
ATTORNEY

United States Patent Office 3,063,497
Patented Nov. 13, 1962

3,063,497
SILO DOOR
George B. Bruecker, Kaukauna, Wis.
Filed Apr. 6, 1959, Ser. No. 804,221
8 Claims. (Cl. 160—352)

This invention relates generally to removable silo doors, and more particularly to curved silo doors configured to curve, arc, bow, or bend inwardly of the silo, and further characterized by flexibility.

The purpose of this invention is to provide a silo door that is most easily removable, and one that eliminates some of the silage unloading problems by providing an indented or in-swept dispositionment of silage, at the silo discharge slot, thereby to compensate for and accommodate some types of silo unloader machines to out-of-round silos.

An object of this invention is the provision of a silo door that is most easily removable from its operative position located across the silo discharge slot.

Another object is to provide an arcuate silo door means that is collapsible.

Still another object of this invention is the provision of an arcuate silo door that is flexible.

Yet a further object is to provide means for vertically recessing or indenting the columnar mass of silage at the silo discharge slot.

A further object of this invention is the provision of a method for vertically recessing or indenting the columnar mass of silage at the silo discharge slot.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a fragmentary front elevation view of a silo, including the slot, and showing the novel configured and flexible silo doors operatively disposed across said silo discharge slot;

FIG. 2 is a plan view of FIG. 1;

FIG. 3 is a plan view of a modification showing a turnbuckle controlled flexible silo door;

FIG. 4 is a plan view of a modification of FIG. 3 showing the door of FIG. 3 wherein the stop lugs are omitted;

FIG. 5 is a fragmentary front elevation view of a silo, showing another modification of the silo door, illustrating a supporting framework for the door;

FIG. 6 is a plan view of FIG. 5;

FIG. 7 is a fragmentary front elevation view of a silo, including its discharge slot, showing still another modification of the silo door, illustrating a collapsible silo door;

FIG. 8 is a plan view of FIG. 7;

FIG. 9 is a plan view of a modification showing a flexible plate door arrangement;

FIG. 10 is a plan view of a modification showing a flexible V-shaped door arrangement; and FIG. 11 is an enlarged section taken along line 11—11 of FIG. 2.

Referring now to the drawings, wherein like reference characters designate like or corresponding parts throughout the several views, there is shown in FIGS. 1 and 2, fragmentary front portions of a cylindrical silo having a discharge slot opening therein, generally indicated at 9, comprising slot sides 10 and 11. Said silo discharge slot 9 is provided with a plurality of substantially identically constructed and inwardly curved, arched or arcuate doors, such as indicated at 12 and 13. Such doors are of short panel length and disposed vertically contiguous to each other to combine to form a tight, inwardly swept closure over the discharge slot 9. Said curved doors are substantially semi-cylindrical in shape and flexible or springy in quality or nature, admitting of yielding to forces applied to their side wing portions and capable of being flexed, or bowed, as hereinafter described.

Said curved doors 12 and 13 may be made of any suitable height to facilitate removal one by one of such doors and to afford convenient access to the customary feed chute (not shown) from progressively lowered levels of the silage in the silo.

On the outer pheriphery corner portions of such arcuate doors are provided paired, oppositely disposed and outwardly projecting stop lugs such as indicated at 14, 15, 16, 17, 18, 19, 21 and 22, respectively. Said lugs are disposed spaced inwardly of the side edge of said arcuate door, to form a corner arrangement therewith, for purposes hereinafter described. The stop lugs are fixed to the doors by any means, such as by welding or the like.

On the upper inner periphery corner portions of said arcuate doors, as distinguished from the previously mentioned outer corner portions, are mounted oppositely disposed pivotal lever means, such as generally indicated at 23, 24, 25 and 26.

Said lever means comprise levers 27, 28, 29 and 31 pivotally mounted on pins 32, 33, 34 and 35 fixed to and projecting from support elements 36, 37, 38 and 39, respectively.

Spacer sleeves, such as indicated at 41 and 42, are provided between levers and the support elements, to dispose the levers clear of the vertical side edges of said arcuate doors when said levers are pivotally operated as hereinafter described. The lever support elements 36, 37, 38 and 39 are secured to the doors as by welding or the like. Nuts, such as indicated at 43 and 44, threadedly engage the threaded end portions of the pins 32, 33, 34 and 35 and provide means for operatively securing the associated levers on said pins. Said operatively opposed levers are mounted to pivot and swing toward and away from each other, and substantially in the same plane.

The slot opening 9 is provided with a framework, generally indicated at 45, with which said arcuate door is associated. Said framework 45 comprises a pair of oppositely disposed angle members 46 and 47 superposed against the slot faces 10 and 11, respectively, the inner corner of said angle members being disposed against the outer edges or arrises of the slot as at 48 and 49, not unlike a corner guard. Said angle members are secured to the body of the silo as by means of anchor bolts or screws 50, and otherwise serve as facing means for the slot faces.

Across the outer leg portions of said angle member 46 and 47 are fixed as by welding, a plurality of horizontally disposed and vertically spaced reinforcing crosspieces or rung-like members such as indicated at 51, 52, 53 and 54, to complete the framework. Said crosspieces function as reinforcing means across the discharge slot, as ladder rungs, and as guards for the reinforcing hoops 55, 56, 57 and 58, respectively.

Said crosspieces comprise channel section members disposed so that their flanges project outwardly of the silo, to receive the hoops therebetween.

The arcuate doors are installed across the silo discharge slot, commencing at the bottom thereof and continuing adjacently and serially thereabove to the desired height. At silo loading time, some desire to install only a few doors at a time, as the filling of the silo progresses; while others install all the doors, all the way to the top of the silo, before silo filling commences.

To install the doors, the doors are disposed inside the silo and substantially symmetrically of the slot 9, the doors bridging or spanning the slot, and the curved construction thereof extending inwardly of the silo. The inset stop lugs and their associated outer edge portions of the doors cooperate to form corner abutment means for receiving the inner edges or arrises of the frame members 46 and 47 in abutment engagement thereagainst.

With said stop lugs shouldered or seated against the respective inner edge slot margins of facing members 46 and 47, the doors are aligned thereby and present a tight closure means for the slot. If desired, the doors may be constructed slightly wider than the slot opening thereby requiring the springy sides to be flexed inwardly, or toward each other, to fit the slot opening between said frame members, and thereby result in an initially tensioned fit of the door sides against the slot facing members.

To remove the doors from an ensilage loaded silo, the flexible door sides are caused to be deflected toward each other, and thereby away from their seats on the slot margins, by means of lever means 23 and 24. The lower moment arm of the levers, such as of lever 27, is swung away from its associated slot face, thereby actuating the upper resistance arm of said lever against the slot face member 47. Increasing the moment arm force, as by swinging the lever 27 further outwardly to the dotted line position 59, see FIG. 2, causes the yieldable door sides to flex, the lugs to unseat, and to depart from their original position adjacent the slot margin, thereby loosening and otherwise freeing the doors in the event they are stuck to silage or slot face member, and allowing said door sides and lugs to be drawn into the slot opening and removed upwardly; or if the sides are flexed toward each other sufficiently, as by pulling inwardly on the levers, the doors can be withdrawn bodily frontally into the opening or space between the slot sides and then disposed of as desired. In the alternative, one side at a time can be flexed inwardly to unseat said side, and pivoting said door to an open position on the other unseated side or unseated stop lugs, and thus removing the door.

If desired, sheet seal means, such as a strip of paper 60, or the like, see FIGS. 2 and 11, can be disposed against the outer periphery of the door, and overlapping the slot edge portions, which seal means becomes interposed between the door and the ensilage when the silo is filled. Such paper can be held in position on the door periphery by any suitable means, such as by means of adhesive 70, or the like, that has only a slight affinity for the paper. Adhesive means 80, or the like, see FIGS. 2 and 11, that has a great affinity for ensilage, or any other suitable means, may be applied to the exposed face of the paper seal to cause the paper to adhere to the compacted ensilage mass when the silo is filled, and also later when the door backing is removed therefrom. When the door is being removed from its operative position in the slot, the lesser adhesion between the paper and the door will yield to the greater adhesion between the packed ensilage and the paper, thereby relieving the door and sustaining the paper on the packed ensilage face.

When the silo door is removed from its operative position across a filled silo slot, the presence of the paper seal covering the ensilage face presents a seal or barrier against airborne decay agents, and the like.

In view of the nature of silage to set rapidly and support itself as initially contained or formed, the curved or arched doors can be utilized in a method of forming the mass of silage, at the silo slot, into an arched recess, without the need of permanent retaining doors. Arch action contributes to said self support. In this method several of the doors can be operatively installed and the silo started to be filled to the top thereof. Thereafter, progressively, the bottom-most door can be removed and installed as a top-most door, as the filling of the silo continues. This procedure can be repeated until the silo is completely filled, and all the doors removed, the silage sustaining itself in an arched formation at the slot.

Obviously, the paper seal 60, as described above, can be interposed incrementally between the door and silage as the silo filling progresses, without the use of adhesives. However, the use of adhesives to sustain the paper is preferred. Or in lieu of a paper seal, the fresh silage face, at the silo slot, can be sprayed with any suitable material to form a seal coat thereover, such as indicated at 90, see FIG. 1.

FIG. 3 is a modification of the door of FIG. 2, wherein the stop lugs shoulder on the inner slot margins directly, the side frame angle members and the lever means being omitted. In this modification the flexible, substantially semi-cylindrical door 61, provided with paired, oppositely disposed and outwardly projecting stop lugs such as indicated at 62 and 63, is also provided with turnbuckle means indicated generally at 64. Said turnbuckle means comprises a turnbuckle sleeve 65 and opposed rods 66 and 67 threadedly engaged with said turnbuckle sleeve. The remote ends of said rods are secured to opposite edge portions of the curved doors as by welding indicated at 68.

The stop lugs, such as indicated at 62 and 63, are located on the outer corner portions of the curved doors, and are fixed thereto as by welding.

These modified doors are flex controlled by the turnbuckle means, either inwardly or outwardly. With the stop lugs shouldered against the respective inner margins of a silo slot, the turnbuckle sleeve can be actuated to expand, bow, or deflect the door sides or wings, outwardly, thereby forcing the edge portions thereof against the sides or faces of the silo slot, thereby frictionally locking said doors in position across the slot opening.

To remove these turnbuckle controlled doors from a silo slot, one needs only to actuate the turnbuckle sleeve so as to retract the flexible door sides or wings, thereby relieving the frictional engagement stress. Continued retraction of the door sides, frees the door from adherence to the silage mass sufficiently to allow the door to be drawn upwardly and removed and disposed of as desired. Should the door sides be drawn toward each other so that the stop lugs are drawn free of the seats and into the slot opening, the doors then can be withdrawn bodily frontally between the slot sides and then can be freely disposed as desired.

FIG. 4 is a modification of the door of FIG. 3, wherein the stop lugs thereof are omitted. In this modification, the edge faces 71 of the flexible, substantially semi-cylindrical door 69 are disposed to abut the inner periphery of the silo at the edge margins of the silo slot. To remove this door construction one merely actuates the turnbuckle means generally indicated at 72 until the door sides are flexed or retracted sufficiently to allow the door to be withdrawn upwardly, or frontally into the space between the slot sides, and then can be disposed of as desired.

FIGS. 5 and 6 shows a further modification of FIG. 2. In this modification each door is provided with an individual framework that is removable as well as the door itself. The framework generally indicated at 73 comprises spaced side angle members 74 and 75, disposed along the inner margins of the silo slot having sides or faces 76 and 77. The angle legs 78 and 79, that bear on the inner periphery of the silo, at the inner margins of the silo slot, are toed confronting each other, their toe edges being substantially flush with the corresponding slot edges.

A pair of spaced rods or rungs 81 and 82 are welded across said side members 74 and 75 to complete the rigid framework 73.

Said framework sections may be made of any suitable height to facilitate removal one by one from progressively lowered levels of the silage in the silo. A desirable height is about 20 inches, though not limited thereto. A plurality of such framework are disposed in the silo, at the slot, as shown in FIGS. 5 and 6.

The doors, cooperable with said framework, are substantially the same height as said framework, though not limited thereto.

In this modification a plurality of similar curved doors, flexible and semi-cylindrical, such as indicated at 83 and 84, are provided with paired, oppositely disposed and outwardly projecting stop lugs, such as indicated at 85 and 86, and 87 and 88. Said stop lugs are preferably located on the outer corner portions of said curved doors, spaced from the vertical edges thereof, and fixed thereto as by welding.

Paired and oppositely disposed hand grip elements 89 and 91, and 92 and 93 are provided on the inner corner portions of said curved doors, and fixed thereto as by welding.

To install the flexible curved doors on said framework, the stop lugs are disposed to seat on the inner edge faces of the framework angle members, and the outer edge portions of the door sides are disposed to abut against the inner faces of said angle member.

If desired, the door sides can be constructed slightly wider than the distance between the angle members, thereby requiring the door sides to be inwardly flexed to fit between said angle members, and thereby develop a tensioned fit of the springy or flexible door on the frame.

To remove the door 83 from an ensilage loaded silo, one grips the paired hand holds, such as 89 and 91, draws inwardly thereon, thereby causing the door sides to be deflected until the stop lugs are unseated from the frame angles, and the doors then are disposed in the space between the frame angles as indicated by the dotted line position 92. The door and its associated framework can then be removed upwardly and disposed of as desired.

FIGS. 7 and 9 show a modification of FIG. 6, wherein the similar curved doors 93 can be rigid or flexible in nature.

In this collapsible modification, each door section is provided with angle member extensions, relatively movably engageable, along the outer edges of said each door, said angle members 94 and 95 being of substantially the same height as the door.

Each door 93 is provided with paired, oppositely disposed bolt receiving apertures, such as indicated at 96 and 97, the apertures being preferably located at the corner portions of said curved door.

The angle members 94 and 95 are provided with transverse slots, such as indicated at 98 and 99, adjacent said apertures, respectively. Bolts, such as indicated at 101 and 102, are directed through said associated slots and apertures, and provided with wing nuts, such as indicated at 103 and 104, respectively, said wing nuts being disposed internally of said curved door means to be available for manipulation.

When the door is to be installed across a silo slot, it is disposed internally of the silo as shown in FIG. 8. It is to be noted that the bolts, such as indicated at 101 and 102, are at the innermost ends of their associated slots and secured thereat by means of wing nuts 103 and 104, respectively. This arrangement allows for some retraction, of the bolts and associated door, in the slots, when the door is to be collapsed and removed.

When the door is to be removed, from its operative position across the silo slot, and the door is springy or flexible in nature, the wing nuts 103 and 104 are loosened to allow some retractive movement of the bolt in the slot, and the wing nuts grasped and pulled inwardly thereby flexing the door sides inwardly from the silage mass, and allowing their removal as indicated in the previously described door structure.

When the door is of a rigid, inflexible nature, the wing nuts 103 and 104 are loosened, and an outward force applied to said wing nuts, thereby forcing the door outwardly, the bolt retracting correspondingly in the slot, and collapsing the door arrangement relative to the angle extension members, until the door is quite free of the silage mass. Thereafter the door means can be withdrawn upwardly from the silage mass and disposed of as desired.

FIG. 9 is a modification showing a silo door comprising a flexible flat plate 105 seated on the slot margins and provided with hand grip means 106. The door is removed by pulling on the hand grip 106, flexing the plate, unseating it thereby, and drawing it into the slot opening for further removal, as indicated by dotted line position 107. Or one can remove the door by unseating one side at a time as indicated by dotted line position 108.

FIG. 10 is a modification showing a V-shaped door 109, provided with hand grips 111, and stop lugs 112 seated on the slot margins of a slot generally indicated at 113. Said door is removable by flexing as indicated above for other constructions.

It is to be understood that all of the modifications discussed can be used with the paper seal means, or the like, interposed between the door and the silage, such as described for the door structure of FIGS. 1 and 2. Also all such modifications can be used in the method of forming the ensilage at the slot, into a recessed or arcuately shaped mass, and sealed, eliminating the need for permanently placed retaining doors, such as described for FIGS. 1 and 2.

The characteristic features of this invention are the provision of a curved door means adapted for use with a silo discharge slot; the provision of a curved and flexible door means adapted for use with a silo discharge slot; the provision of a flexible door means adapted for use with silo discharge slot; and a method for forming the ensilage at a silo discharge slot into a recess shaped mass, eliminating the need of permanently placed retaining doors.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. In a silo having a doorway opening in its wall extending substantially its entire height, a doorway closure assemblage comprising: a series of vertically-aligned and contiguous angle bars removably mounted on the silo wall adjacent both sides of said doorway opening, each of said angle bars being provided with a leg projecting inwardly from the silo wall having a slotted opening therethrough; a series of vertically-aligned and contiguous, bow-shaped panels spanning and covering said opening, said panels being of substantially the same height as said angle bars and having apertures therethrough adjacent their side edges registering with said angle bar slots, said bow-shaped panels being disposed to curve inwardly from the silo wall; retaining bolts projected through said registering angle bar slots and panel apertures; and wing nuts removably threaded onto the ends of said bolts, said bolt and nut members removably securing said panels to and between said angle bars.

2. In a storage structure, the combination comprising: a substantially vertical wall having a doorway opening extending substantially its entire height; a number of vertically aligned and contiguous panels spanning and covering said opening and extending inwardly of the wall, each of said panels having a pair of substantially vertical side edges with at least one of said side edges of each panel being movable toward the other side edge of said panel; means associated with each side edge of said panels engageable with the wall bordering the doorway opening for preventing undesired displacement of said doorway-covering panels with respect to said opening; and means associated with each side edge of said panels engageable with the inner surface of the wall and adapted to prevent radial displacement of said panels transversely to the plane of said wall.

3. In a silo having a doorway opening therein, a doorway closure assembly comprising: a bow-shaped panel removably mounted in covering relation over said doorway opening and projecting inwardly of the silo wall; and sheet seal means adhesively attached to and covering the entire inner surface of said panel, said sheet seal means being interposed between said panel and the ensilage when the silo is filled, and said sheet seal means having an adhesive substance on both of its faces which has a greater affinity for the ensilage than for said panel, whereby said sheet seal will adhere to and remain on the face of the ensilage when said door panel is removed.

4. In a storage structure, the combination comprising: a substantially vertical wall having a doorway opening therein, a flexible bow-shaped panel spanning and covering said opening and extending inwardly of the wall, said panel having a pair of substantially vertical side edges capable of being flexed toward and away from each other, said side edges bearing against the wall bordering the doorway opening to prevent displacement of the panel in the plane of the wall, and means secured to each side edge portion of said panel and extending laterally beyond the respective side edge and disposed in engagement with the inner surface of the wall to prevent displacement of said panel transversely to the plane of said wall.

5. In a storage structure the combination comprising: a substantially vertical wall having a doorway opening therein, a panel spanning and covering said opening and extending inwardly of the wall, said panel having a pair of substantially vertical side edges with at least one of said side edges of the panel being movable toward the other side edge of the panel, the side edges of the panel being disposed in engagement with the wall bordering the doorway opening and serving to prevent displacement of the panel in the plane of said wall, and a pair of projections secured to the surface of the panel facing inwardly of the storage structure with each of said projections being spaced from a side edge and disposed to engage the inner surface of the wall and prevent displacement of said panel transversely to the plane of said wall.

6. In a silo, the combination comprising a substantially cylindrical wall having a doorway opening extending substantially its entire height, a series of vertically aligned and contiguous panels spanning and covering said opening and extending inwardly of the silo wall, each of said panels having a pair of substantially vertical side edges with at least one of said side edges of each panel being movable toward the other side edge of said panel, means associated with each side edge of the panels and engageable with the silo wall bordering the doorway opening for preventing displacement of said doorway covering panels circumferentially of said wall, means associated with each side edge of the panels and engageable with the inner surface of the wall for preventing displacement of said doorway covering panels radially outward of said silo wall, and means connected to each panel and extending between the side edge portions of said panel for preventing movement of the side edges toward each other due to the pressure of material within the silo.

7. In a silo, the combination comprising a substantially cylindrical wall having a doorway opening extending substantially its entire height, a series of vertically aligned and contiguous panels spanning and covering said opening and extending inwardly of the silo wall, each of said panels having a pair of substantially vertical side edges with at least one of said side edges of each panel being movable toward the other side edge of said panel, means associated with each side edge of the panels and engageable with the silo wall bordering the doorway opening for preventing displacement of said doorway covering panels circumferentially of said wall, means associated with each side edge of the panels and engageable with the inner surface of the wall for preventing displacement of said doorway covering panels radially outward of said silo wall, and means secured to the surface of the panel facing outwardly of the silo wall for moving one side edge of said panel towards the other side edge to permit removal of said panel outwardly through the doorway opening.

8. In a silo, the combination comprising a substantially cylindrical wall having a doorway opening extending substantially its entire height and having a pair of opposed vertical surfaces bordering said doorway opening, a vertical frame member secured to each of said surfaces, a series of vertically aligned contiguous bow-shaped panels spanning and covering said doorway opening and extending inwardly of the wall, each of said panels having a pair of substantially vertical side edges capable of being flexed toward and away from each other, said side edges being disposed in engagement with said frame members to prevent displacement of said panels in a direction circumferential of the silo wall, and means associated with each side edge of the panels and disposed in engagement with the inner surface of the silo wall for preventing displacement of said panels in a direction radially outward of the silo wall.

References Cited in the file of this patent

UNITED STATES PATENTS

| | | |
|---|---|---|
| 18,295 | Odian | Sept. 29, 1857 |
| 706,596 | Poyner | Aug. 12, 1902 |
| 942,095 | Moeke | Dec. 7, 1909 |
| 1,201,006 | Wallace | Oct. 10, 1916 |
| 1,243,129 | Bauder | Oct. 16, 1917 |
| 1,254,131 | Flynn | Jan. 22, 1918 |
| 1,419,236 | Dickleman | June 13, 1922 |
| 2,193,469 | Ashton | Mar. 12, 1940 |
| 2,261,141 | Davis | Nov. 4, 1941 |
| 2,261,142 | Davis | Nov. 4, 1941 |
| 2,470,921 | Dow | May 24, 1949 |
| 2,483,523 | Brandon et al. | Oct. 4, 1949 |
| 2,575,757 | Hardy | Nov. 20, 1951 |
| 2,602,501 | Roos | July 8, 1952 |
| 2,843,201 | Laubenthal | July 15, 1958 |